United States Patent Office 3,741,917
Patented June 26, 1973

3,741,917
COLD CURE HIGH RESILIENCE FOAM
Edward Lewis Morehouse, New City, N.Y., assignor to Union Carbide Corporation, New York, N.Y.
No Drawing. Filed Oct. 26, 1970, Ser. No. 84,181
Int. Cl. C08g 22/46
U.S. Cl. 260—2.5 AH
18 Claims

ABSTRACT OF THE DISCLOSURE

A process for producing cold cure polyether urethane foam comprising foaming and reacting a mixture comprising (1) organic polyol, (2) polyisocyanate, (3) blowing agent, (4) catalyst and (5) a siloxane block copolymer; mixtures suitable for use in producing said cold cure foams; and said cold cure polyether urethane foams derived therefrom.

BACKGROUND OF THE INVENTION

This invention relates to high resilience cold cure polyether urethane foams and more particularly to the use of certain organosilicon surfactants in the production of such foams.

The formation of any urethane foam depends primarily on the reaction between a polyol and an isocyanate in the presence of blowing agents. Most conventional urethane foams are hot cured foams. With hot cured urethane foams, whether slabstock or molded, the rate of reaction and heat generated by the exothermic reaction between the polyol and isocyanate is sufficient to cure the center of the foam piece, but the surface temperature of the foam usually does not rise sufficiently high enough to cure the outside rapidly. Consequently it is generally necessary to apply some form of external heating to complete the curing rapidly and to eliminate any surface tackiness. The general method is to postcure the foam while in the mold at temperatures of 100° C. to 150° C. in an infrared oven for about ten to thirty minutes.

More recently cold cure urethane foams have been developed in an attempt to increase the exothermic temperature of the reaction and generally speed up the entire gelation process. This is accomplished through the use of polyols having a substantial amount of primary hydroxyl groups. Cold cure urethane foam is also referred to as high resilience foam.

This cold cure technology offers many potential and real economic advantages to the manufacturer. For example, because of faster cure times the overall processing time is reduced and more foam can be produced per day thus substantially lowering capital expenditure. Moreover, the properties of cold cure urethane foam unlike hot cured urethane foam are very similar to those of latex foam. In addition, compared to hot cured urethane foam, cold cure urethane foam characteristically provides better resilience, higher SAC factors (i.e. load bearing properties which relate to comfort in cushioning applications), superior flex fatigue and lower flammability.

Because of the high reactivity of cold cure sysems, the foams are generally self-stabilizing or very nearly self-stabilizing and can be generally obtained without the use of a stabilizing agent. However, several drawbacks still remain with regard to cold cure technology. For instance, without an agent to control cell size, the cold cure urethane foam structure typically is coarse, often nonuniform and may contain voids; the foam also has a tendency to settle and may even collapse.

SUMMARY OF THE INVENTION

It has now been discovered that the above drawbacks can be overcome and that flexible cold cure polyether urethane foams having high resiliency can be prepared according to the instant invention which involves employing certain siloxane block copolymer surfactants in conjunction with certain organic polyols as more fully defined below.

This invention is based in part on the discovery that certain low molecular weight siloxane block copolymer surfactants can be used to control the cell uniformity of cold cure polyether urethane foams with little if any foam shrinkage and without any severe adverse effect to the foam's resilience and its resistance towards flammability. Moreover, voids in the foam are eliminated or at least greatly reduced by this instant invention and the cell structure of the cold cure polyether urethane foam is also much more uniform and finer than where no surfactant agent is used.

This discovery is indeed surprising, since not all siloxane block copolymer surfactants can be employed. For instance, relatively high molecular weight siloxane surfactants which are good stabilizers for conventional flexible hot cure urethane foams are not satisfactory for cold cure systems, because they cause foam shrinkage and severe loss in resilience at surfactant levels where there is an improvement in cell structure. Attempts to lower the surfactant concentration of such conventional high molecular weight siloxane surfactants to improve on foam shrinkage merely serve to destroy any gain in improved cell structure possible at the proper level of concentration. Furthermore, far lower foam flammability is obtainable with the specific siloxane block copolymer surfactants of this invention than with the high molecular weight siloxane stabilizers of conventional hot cure flexible foam. In addition, it has also been discovered that crushing of the cold cure urethane foam, a common industrial practice, can extend the usefulness of the siloxane block copolymer surfactants employed in this invention. For example, crushing of the uniform, fine celled, non-shrinking cold cure polyether urethane foams stabilized by the siloxane block copolymer surfactants useful in this invention can result in higher resiliency than that of the corresponding uncrushed foams. In contrast when siloxane block copolymer surfactants having compositions outside of the scope of this invention are used, foam porosities are so low that even the crushed foams are deformed severely by shrinkage.

Therefore it is an object of this invention to provide a process for producing cold cure polyether urethane foams. It is another object of this invention to provide compositions suitable for use in producing a uniform, high resilient cold cure polyether urethane foam. Other objects and advantages of this invention will become readily apparent from the following description and appended claims.

More specifically the instant invention is directed, in part, to a process for preparing cold cure polyether urethane foam, said process comprising foaming and reacting a reaction mixture comprising:

(I) an organic polyol selected from the group consisting of (A) a polyether triol containing at least 40 mole percent primary hydroxyl groups and having a molecular weight from about 2,000 to about 8,000 and (B) a mixture of said polyether triol and other polyethers having an average of at least two hydroxyl groups, said polyether triol of said mixture amounting to at least 40 weight percent of the total polyol content;

(II) a polyisocyanate, said organic polyol and said polyisocyanate being present in the mixture in a major amount and in the relative amount required to produce the urethane;

(III) a blowing agent in a minor amount sufficient to foam the reaction mixture;

(IV) a catalytic amount of a catalyst for the production of the urethane from the organic polyol and polyisocyanate; and (V) a minor amount of a siloxane block copolymer surfactant having a molecular weight from about 500 to about 4,000, a siloxane content from about 25 to about 90 weight percent based on the weight of the copolymer and an oxyethylene content of at least 35 weight percent based on the total amount of any oxyalkylene groups present in said copolymer.

It is to be understood of course that the above process and the appended claims read on employing a single ingredient of the type specified or any of the various combinations of ingredient mixtures possible. For example, in addition to employing a single ingredient of the types specified, if desired, a mixture of triols, a mixture of polyisocyanates, a mixture of blowing agents, a mixture of catalysts and/or a mixture of siloxane block copolymers can be employed. Likewise the triol-polyether starting mixture could consist of a single triol and a mixture of polyethers, a mixture of triols and a single polyether or a mixture of two or more triols and two or more polyethers.

DESCRIPTION OF THE PREFERRED EMBODIMENTS

As indicated above, the siloxane block copolymers employed as surfactants in this invention are characterized by certain molecular weights, siloxane contents and oxyethylene contents. Provided that the copolymers conform to these limitations, they may have any of a wide variety of structures and substituents and still be effective in this invention. Subject to this qualification, a more detailed description of some of the useful siloxane block copolymers is presented below.

The siloxane block copolymers that are useful in this invention are those copolymers having a siloxane portions (or blocks) composed essentially of siloxane groups represented by the formula:

$$R_b SiO_{\frac{4-b}{2}} \quad (I)$$

wherein $b$ has a value of 1 to 3 inclusive and R is a monovalent hydrocarbon group or a

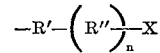

group where R' is divalent organic group linked directly to the silicon atom, R'' is an oxyalkylene group, X is a monovalent organic terminating group and $n$ is 0 or an integer. The groups represented by R, R', R'' and X and the values of $n$ and $b$ can be the same or different in any given group, block or portion of the copolymer. However each siloxane portion of the copolymer must contain (1) at least one group represented by formula (I) wherein at least one group represented by R is a

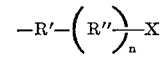

group and (2) at least one group represented by Formula 1 wherein $b$ is 2 and both groups represented by R are monovalent hydrocarbon radicals.

Illustrative of the monovalent hydrocarbon groups that are represented by R in Formula I are alkyl groups (for example, methyl, ethyl, isopropyl, octyl, dodecyl, octadecyl, ecisoyl and the like); alkenyl groups (for example, vinyl, allyl and the like); cycloalkenyl groups (for example, cyclohexenyl and the like); aryl groups (for example, phenyl, naphthyl and the like); aralkyl groups (for example, benzyl, phenylethyl and the like); alkaryl groups (for example, tolyl, n-hexylphenyl and the like); and cycloalkyl groups (for example, cyclohexyl and the like). If desired such group can contain substituents such as halogens and the like. Preferably said hydrocarbon radicals contain from 1 to 20 carbon atoms.

The structure of the divalent organic group represented by R'' in Formula I is dependent upon the type of reaction involved in producing the siloxane block copolymer. Such copolymers can be produced by any number of reactions thereby giving rise to a variety of divalent organic groups linking the siloxane portion to the

portion of the copolymer. The processes involve reacting a siloxane with an organic compound such as alcohols, polyethers, olefinically unsaturated compounds, and the like. Typical of such reactions are the following:

```
(a) ≡SiOR³ + HOC≡ → ≡SiOC≡ + R³OH
                O                      O
                ‖                      ‖
(b) ≡SiOC—R³ + HOC≡ → ≡SiOC≡ + HOC—R³
(c) ≡SiH + HOC≡ → ≡SiOC≡ + H₂
(d) ≡SiX + HOC≡ → ≡SiOC≡ + HX
(e) ≡SiOH + HOC≡ → ≡SiOC≡ + H₂O
(f) ≡Si(CH₂)₃OCH₂CH(─O─)CH₂ + HOC≡ → ≡Si(CH₂)₃OCH₂CH(OH)CH₂OC≡
(g) ≡SiH + CH₂=CHCH₂OC≡ → ≡Si(CH₂)₃OC≡
(h) ≡SiRHal + MOC≡ → ≡SiROC≡ + MHal
(i) ≡SiRNCO + HOC≡ → ≡SiRNHCOOC≡
(j-1) ≡COH + OCNRNCO → ≡COOCNHRNCO
(j-2) ≡SiRNH₂ + OCNRNHCOOC≡ → ≡SiRNHCONHRNHCOOC≡
(k) ≡SiRNH₂ + ClCOCH₂— → ≡SiRNHCOCH₂— + HCl
(l) ≡SiRCOCl + HOC≡ → ≡SiRCOOC≡ + HCl
(m-1) ≡COOCCl + CH₂=CHCH₂OH → ≡COOCOCH₂CH=CH₂ + HCl
(m-2) ≡SiH + CH₂=CHCH₁=OCOOC≡ → SiCH₂CH₂CH₂OCOOC≡
(n) ≡SiCl + HSC≡ → ≡Si—S—C≡ + HCl
                    Me                 Me
                    |                  |
(o) ≡SiCl + HNC≡ → ≡Si—N—C≡ + HCl
```

In the above Equations (a) to (o), $R^3$ represents a monovalent hydrocarbon radical, preferably an alkyl or aryl group, X represents a halogen atom or amino group such as $NH_2$, $NHR^2$ and $$NR_2^2$$

wherein $R^2$ is a monovalent hydrocarbon radical, Hal represents a halogen, i.e., bromine, chlorine, fluorine, or iodine, M is an alkali metal such as sodium or potassium, Me is methyl, and R is a divalent hydrocarbon radical, preferably a saturated aliphatic radical, save for equation (j-2) where R is preferably arylene or an alkyl substituted arylene radical.

The above equations also serve to illustrate the various types of divalent organic groups represented by R' in Formula I. Preferably the divalent organic group is a —$OC_aH_{2a}$— group where $a$ is an integer and the oxygen atom is linked directly to the silicon atom, or more preferably the divalent group is a divalent hydrocarbon group linked directly to the silicon atom as herein below defined.

The foregoing equations represent processes well known in the art. Preferably siloxane block copolymers of this invention are prepared by the known platinum-catalyzed addition of a hydrosiloxane to an olefinically unsaturated ether or a polyether. Illustrations of ether intermediates for preparation of surfactants of the invention are vinyl, allyl and methallyl ethers, polyethers such as vinyl, allyl, methallyl terminated triglycols, diethylene glycols and polyethers having molecular weights of 150 to 900 based on the weight of the oxyalkylene groups and the like. Such intermediates are terminated or capped with a group represented by X in Formula I.

The siloxane block copolymers useful as surfactants in this invention contain one or more siloxane groups represented by Formula I wherein $b$ is 2 and both R groups are monovalent hydrocarbon groups wherein either the same hydrocarbon groups are attached to the silicon atoms (e.g. dimethylsiloxy, diphenylsiloxy, diethylsiloxy and the like) or different hydrocarbon groups are attached to the silicon atoms (e.g. methylphenylsiloxy, phenylethylsiloxy, and the like). The copolymers also contain one or more siloxane groups represented by Formula I wherein at least one R group is a

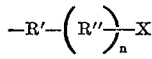

radical as defined above. By way of illustration ethylenemethylsiloxy groups

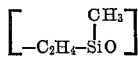

ethyleneoxymethylsiloxy groups

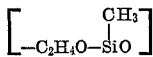

and the like can be present in the copolymer. Thus the copolymers of this invention can contain trifunctional siloxane groups (e.g. monomethylsiloxane groups, $CH_3SiO_{1.5}$), difunctional siloxane groups (e.g. dimethylsiloxane groups, $(CH_3)_2SiO$—), monofunctional siloxane groups, (e.g. trimethylsiloxane groups, $(CH_3)_3SiO$—), or combinations of these types of siloxane groups having the same or different substituents. Due to the functionality of the siloxane groups, the copolymer can be predominantly linear or cyclic or cross-linked or it can have combinations of these structures.

The siloxane portion of the block copolymers useful as surfactants in this invention can contain organic end-blocking or chain terminating organic groups, in addition to the monofunctional siloxane chain terminating groups encompassed by Formula I. By way of illustration, the siloxane portion can contain such organic end-blocking groups as hydroxyl, aryloxy groups (such as phenoxy), alkoxy groups (such as methoxy, ethoxy, propoxy and butoxy), acyloxy groups (such as acetoxy), and the like.

The siloxane portion of the block copolymers useful in this invention can contain, in addition to the groups represented by Formula I, minor amounts of siloxane groups represented by the formula:

(I-a)

wherein R has the meaning defined in Formula I, $e$ has a value from 0 to 2, $f$ has a value from 1 to 2 and $(e+f)$ has a value from 1 to 3, inclusive.

The preferred siloxane block copolymers employed in this invention are those of Formula I above wherein $n$ is an integer, i.e. siloxane-oxyalkylene block copolymers. The oxyalkylene portions or "blocks" of these siloxane-oxyalkylene block copolymers are composed of oxyalkylene groups represented by the formula $$[-R'''O-] \qquad (II)$$

wherein R''' is an alkylene group, with the proviso that at least 35 weight percent, preferably 50 up to and including 100 weight percent of the oxyalkylene groups are oxyethylene groups. Illustrative of the oxyalkylene groups that are represented by Formula II are oxyethylene, oxypropylene, oxy-1,4-butylene, oxy-1,5-amylene, oxy-2,2-dimethyl-1,3-propylene, oxy-1,10-decylene and the like. The oxyalkylene portion of the copolymers can contain more than one of the various types of oxyalkylene groups represented by Formula II, provided that at least 35 weight percent of the oxyalkylene groups are oxyethylene groups. By way of illustration, the oxyalkylene blocks can contain only oxyethylene groups or both oxyethylene and oxypropylene groups, or other combinations of oxyethylene groups and the various other types of oxyalkylene groups represented by Formula II. Preferably the oxyalkylene groups consist of oxyethylene or a mixture of oxyethylene and oxypropylene radicals.

Accordingly the term "block copolymer" is used herein to denote a material wherein at least one section ("block") of the molecule is composed of recurring monomeric units of one type and at least one other section ("block") of the molecule composed of recurring monomeric units of a different type. The different sections or blocks in the molecule can be arranged in any configuration (e.g., AB, ABA, branched or cyclic). Thus the term "block copolymers" as used herein includes graft copolymers. The block copolymers used in this invention can be discrete chemical compounds. Usually, however, the block copolymers are mixtures of various discrete block copolymeric species. The block copolymers are usually mixtures due, at least in part, to the fact that the siloxane and polyoxyalkylene reactants used to produce the block copolymers are themselves usually mixtures.

Illustrative of the various organic terminal groups represented by X in Formula I above are such end-blocking groups as hydroxy; alkoxy (such as methoxy, ethoxy, propoxy, butoxy and the like); aryloxy (such as phenoxy and the like); arylkyloxy (such as benzyloxy, phenylethoxy and the like); alkenyloxy (such as vinyloxy, allyloxy and the like); acyloxy (such as acetoxy and the like); carbamyloxy (such as —OOCNHCH$_3$), —OOCNHC$_2$H$_5$ and the like); and carbonate groups (such as

—OCOOCH$_3$ and the like). Moreover in the siloxane-oxyalkylene block copolymers a single group can serve as an end-blocking group for more than one oxyalkylene chain. For example, the glyceroxy group,

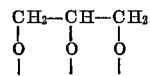

can serve as an end-blocking group for three oxyalkylene groups. Trihydrocarbylsiloxy groups (e.g., trimethylsiloxy groups) can also endblock the oxyalkylene chains. Preferably X is a lower alkoxy radical.

Illustrative of the preferred divalent hydrocarbon groups represented by R' in Formula I are alkylene groups (such as methylene, ethylene, propylene, butylene, 2,2-dimethyl-1,3-propylene, decylene and the like); arylene groups such as phenylene, p,p'-diphenylene, and the like); and alkarylene groups (such as phenylethylene and the like. Preferably, the divalent hydrocarbon group is an alkylene group containing from two to four carbon atoms. Siloxane groups containing divalent hydrocarbon groups as substituents are illustrated by groups having the formulae:

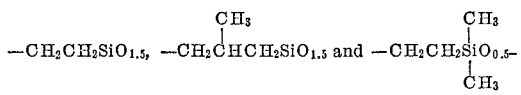

Siloxane-oxyalkylene block copolymers that are especially suited for use as surfactants in this invention are those having the formula:

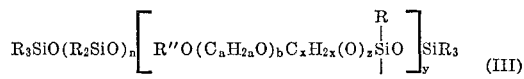

wherein Z has a value of 0 or 1; $n$ has a value from 1 to 15 inclusive, preferably 2 to 7 inclusive; $y$ has a value from 1 to 10 inclusive, preferably 2 to 6 inclusive; $a$ has a value from 2 to 4 inclusive; preferably 2 to 3 inclusive; $x$ has a value from 2 to 4 inclusive; $b$ has a value from 0 to 20 inclusive, preferably 3 to 10 inclusive; R'' is a hydrogen atom, an alkyl radical, an aryl radical, an aralkyl radical, an acyl radical, a carbamyl radical or a carbonate radical, more preferably an alkyl radical containing from 1 to 4 carbon atoms, especially, methyl; and R is an alkyl radical, an aryl radical, or an aralkyl radical, preferably an alkyl radical containing from 1 to 4 carbon atoms, especially, methyl.

While the siloxane block copolymers of this invention can have molecular weights ranging from about 500 to about 4,000 and contain from about 25 to about 90 weight percent siloxane based on the weight of the copolymer, preferably they have molecular weights rangeing from about 500 to about 2,500 and contain about 40 to 70 weight percent siloxane. Conversely the

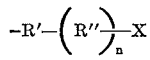

substituents in Formula I of the copolymers comprises from about 75 to about 10 weight percent of the block copolymer and preferably from about 60 to about 30 weight percent.

The siloxane block copolymer surfactants employed as the foam stabilizers in this invention can vary over wide ranges and are generally employed in amounts ranging from about 0.025 to about 5 parts by weight or greater, per hundred parts by weight of the organic polyol starting material. Generally there is no commensurate advantage to using amounts of surfactant greater than about 5 parts by weight, while the use of amounts below 0.025 part by weight can detract from stability against foam shrinkage. Preferably the siloxane block copolymers are employed in amounts ranging from about 0.05 to about 1.5 parts by weight per hundred parts by weight of the organic polyol starting material.

The polyhydroxyl reactants (organic polyols) employed in this invention as the starting materials to prepare the polyurethane foams can be any polyether triol containing at least 40 mole percent of primary hydroxyl groups and having a molecular weight from about 2,000 to about 8,000. Conversely said polyether triols can contain no more than 60 mole percent of secondary hydroxyl groups. Preferably said polyether triols contain about 60 to 90 mole percent of primary hydroxyl groups and have a molecular weight from about 4,000 to about 7,000.

The preferred polyether triols of this invention are polyalkylenether triols obtained by the chemical addition of alkylene oxides to trihydroxyl organic containing materials, such as glycerol; 1,2,6-hexanetriol; 1,1,1-trimethylolethane; 1,1,1-trimethylolpropane; 3-(2-hydroxyethoxy)-1,2-propanediol; 3,-(2-hydroxypropoxy)-1,2-propenediol; 2,4 - dimethyl - 2-(2-hydroxyethoxy)methylpentanediol-1,5-; 1,1,1-tris[(2-hydroxyethoxy)methyl]ethane; 1,1,1-tris[(2-hydroxypropoxy)methyl]-propane; and the like, as well as mixtures thereof.

Alternatively the organic polyol starting materials of this invention can be mixtures consisting essentially of said above defined polyether triols and other polyether polyols having an average of at least two hydroxyl groups, said above defined polyether triols amounting to at least 40 preferably at least 50, weight percent of the total polyol content of the mixtures. Illustrative of such other polyethers are triols outside of the scope defined above, diols, tetraols and polymer/polyols, and the like, as well as mixtures thereof.

Examples of such polyether polyols that can be mixed witth the above defined polyether triols include those adducts of alkylene oxide to such polyols as diethylene glycol; dipropylene glycol; pentaerythritol; sorbitol; sucrose; lactose; alpha-methylglucoside; alpha-hydroxylalkylglucoside; novolac resins; water; ethylene glycol; propylene glycol; trimethylene glycol; 1,2-butylene glycol; 1,3-butanediol; 1,4-butanediol; 1,5-pentanediol; 1,2-hexane glycol; 1,10-decanediol; 1,2-cyclohexanediol; 2-butene-1,4-diol; 3-cyclohexene-1,1-dimethanol; 4-methyl-3-cyclohexene-1,1-dimethanol; 3 - methylene - 1,5-pentanediol; (2-hydroxyethoxyl) - 1 - propanol; 4-(2-hydroxyethoxy)-1-butanol; 5 - (2-hydroxypropoxy)-2-octanol; 3-allyloxy-5-pentanediol; 2 - allyloxymethyl-2-methyl-1, 3-propanediol; [4,4-pentyloxymethyl]-1, 3-propanediol; 3-(o-propenyl-phenoxy)1,2 - propanediol; 2,2-diisopropylidenebis(p-phenyleneoxy)-diethanol; and the like; or phosphoric acid; benzenephosphoric acid; polyphosphoric acids such as tripolyphosphoric acid and tetrapolyphosphoric acid; and the like; as well as mixtures thereof.

Another type of polyether polyol that can be mixed with the above defined polyether triols and used as the strating materials of this invention are graft polymer/polyether compositions obtained by polymerizing ethylenically unsaturated monomers in a polyether as described in British Pat. No. 1,063,222 and U.S. Pat. No. 3,383,351, the disclosures of which are incorporated herein by reference thereto. Suitable monomers for producing such compositions include, for example, acrylonitrile, vinyl chloride, styrene, butadiene, vinylidene chloride, and the like. Suitable polyethers for producing such compositions include, for example those polyethers hereinabove-described. These graft polymer/polyether compositions can contain from about 1 to about 70 weight percent, preferably about 5 to about 50 weight percent and most preferably about 10 to about 40 weight percent of the monomer polymerized in the polyether. Such compositions are conveniently prepared by polymerizing the monomers in the selected polyether at a temperature of 40° to 150° C. in the presence of a free radical polymerization catalyst, such as peroxides, persulfates, percarbonates, perborate and azo compounds as more fully described by the above patent references. The resulting compositions may contain a small amount of unreacted polyether, monomer and free polymer as well as the graft polymer/polyether complex. Especially preferred are the graft polymer/polyethers obtained from acrylonitrile and polyether triols.

The alkylene oxides employed in producing the preferred polyethers described above normally have from 2 to 4 carbon atoms, inclusive while porpylene oxide and mixtures of propylene oxide and ethylene oxide are especially preferred.

The exact organic polyol or polyols employed as the starting materials of this invention merely depend on the end use of the cold cure polyether urethane foam. For instance, the employment of polyether triols having at least 40 mole percent primary hydroxyl groups and molecular weights from 2,000 to 8,000 preferably 4,000 to 7,000 generally have hydroxyl numbers from 84 to 21, preferably 42 to 28 and give primarily flexible polyether foams. The supplementary polyethers which may have any proportion of primary to secondary hydroxyl groups and which may be mixed with the required polyether triols can be used to control the degree of softness of the foam or vary the load bearing properties of the foam. Such limits are not intended to be restrictive, but are merely illustrative of the large number of possible combinations of polyether triols and other polyethers that can be employed.

The hydroxyl number is defined as the number of milligrams of potassium hydroxide required for the complete neutralization of the hydrolysis product of the fully acetylated derivative prepared from 1 gram of polyol or mixtures of polyols with or without other crosslinking additives used in the invention. The hydroxy number can also be defined by the equation:

$$OH = \frac{56.1 \times 1000 \times f}{m.w.}$$

wherein OH=hydroxyl number of the polyol.

A variety of organic isocyates can be employed in the foam formulations of this invention for reaction with the organic polyol starting materials above described to provide cold cure polyether urethane foams. Preferred isocyanates are polyisocyates and polyisothiocyanates of the general formula:

$$(QNCY)_i$$

wherein Y is oxygen, $i$ is an integer of two or more and Q is an organic radical having the valence of $i$. For instance, Q can be a substituted or unsubstituted hydrocarbon radical, such as alkylene and arylene, having one or more aryl-NCY bonds and/or one or more alkyl —NCY bonds. Q can also include radicals such as —QZO—, where Q is an alkylene or arylene group and Z is a divalent moiety such as —O—, —O—Q—O, —CO—, $CO_2$, —S—, —S—Q—S—, —$SO_2$— and the like. Examples of such compounds include hexamethyl diisocyanate, 1,8-diisocyanato-p-menthane, xylylene diisocyanate, $(OCNCH_2CH_2CH_2OCH_2)_2O$, 1-methyl-2,4-diisocyanatocyclohexane, phenylene diisocyanates, tolylene diisocyanates, chlorophenylene diisocyanates, diphenylmethane-4,4'-diisocyanate, naphthalene - 1,5 - diisocyanate, triphenylmethane-4,4'-4'''-triisocyanate, and isopropylbenzene-alpha-4-diisocyanate.

Further included among the isocyanates useful in this invention are dimers and trimers of isocyanates and diisocyanates and polymeric diisocyanates such as those having the general formula:

$$(QNCY)_i \text{ and } [Q(NCY)_i]_j$$

in which $i$ and $j$ are integers of two or more, and/or (as additional components in the reaction mixtures) compounds of the general formula:

$$L(NCO)_i$$

in which $i$ is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; compounds containing a ≡Si—NCO group, isocyanates derived from sulfonamides ($QSO_2NCO$), cyanic acid, thiocyanic acid, and compounds containing a metal —NCO radical such as tributyltinisocyanate.

More specifically, the polyisocyanate component employed in the polyurethane foams of this invention also include the following specific compounds as well as mixtures of two or more of them: 2,4-tolylene diisocyanate, 2,6-tolylene diisocyanate, crude tolylene diisocyanate, bis(4 - isocyanatophenyl)methane, polymethylene polyphenylisocyanates that are produced by phosgenation of anilineformaldehyde condensation products, dianisidine diisocyanate, toluidine diisocyanate, xylylene diisocyanate, bis(2-isocyanatoethyl)-fumarate, bis(2 - isocyanatoethyl) carbonate, 1.6-hexamethylene-diisocyanate, 1,4-tetramethylene-diisocyanate, 1,10 - decamethylene - diisocyanate, cumene-2,4-diisocyanate, 4-methoxy-1,3-phenylene diisocyanate, 4-chloro-1,3-phenylenediisocyanate, 4-bromo-1,3-phenylenediisocyanate, 4 - ethoxy-1,3-phenylene-diisocyanate, 2,4'-diisocyanato-diphenylether, 5,6 - dimethyl-1,3-phenylenediisocyanate, 2,4 - dimethyl-1,3-phenylenediisocyanate, 4,4'-diisocyanatodiphenylether, bis 5,6-(2-isocyanotoethyl)bicyclo [2.2.1]hept-2-ene, benzidinediisocyanate, 4,6 - dimethyl-1,3-phenylenediisocyanate, 9,10-anthracene-diisocyanate, 4,4'-diisocyanatodibenzyl, 3,3-dimethyl-4,4'-diisocyanatodiphenylmethane, 2,6 - dimethyl-4,4'-diisocyanato-diphenyl, 2,4-diisocyanatostilbene, 3,3'-dimethyl-4,4'-diisocyanatodiphenyl, 3,3' - dimethoxy-4,4'-diisocyanatodiphenyl, 1,4-antharcenediisocyanate, 2,5-fluorene-diisocyanate, 1,8-naphthalenediisocyanate, 2,6-diisocyanatobenzfuran, 2,4,6 - toluenetriisocyanate, and many other organic polyisocyanates that are known in the art, such as those that are disclosed in an article by Siefken, Ann., 565, 75 (1949). In general, the aromatic polyisocyanates are preferred.

Particularly useful isocyanate components of high resilience cold cure formulations within the scope of this invention are combinations of isomeric tolylene diisocyanates and polymeric isocyanates having units of the formula

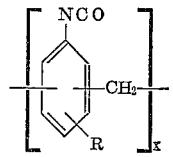

wherein R is hydrogen and/or lower alkyl and $x$ has a value of at least 2.1. Preferably the lower alkyl radical is methyl and $x$ has a value of from 2.1 to about 3.0.

The amount of polyisocyanate employed will vary slightly depending on the nature of the polyurethane being prepared. In general the polyisocyanates are employed in the foam formulations of this invention in amounts that provide from 80 to 150 percent, preferably from 90 to 110 percent of the stoichiometric amount of the isocyanato groups required to react with all of the hydroxyl groups of the organic polyol starting materials and with any water present as a blowing agent. Most preferably, a slight amount of isocyanato groups in excess to the stoichiometric amount is employed.

The blowing agents employed in this invention include methylene chloride, water, liquefied gases which have boiling points below 80° F. and above −60° F., or by other inert gases such as nitrogen, carbon dioxide, methane, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichloromonofluoromethane, dichlorodifluoromethane, dichlorofluoromethane, 1,1-chloro-1-fluoroethane, 1-chloro-1,1 - difluoro, 2,2 - dichloroethane, and 1,1,1 - trifluoro, 2-chloro-2-fluoro, 3,3-difluoro-4,4,4-trifluorobutane. The amount of blowing agent used will vary with density desired in the foamed product. Usually from 2 to 20 parts by weight of the blowing agent per 100 parts by weight of the organic polyol starting materials are preferred.

The catalysts employed in this invention include any of the catalyst used in producing conventional flexible polyurethane foam. Because of the high degree of reactivity of the cold cure high resilience polyether urethane foam system of this invention amines rather than metal-amine combinations are preferred. Illustrative of such conventional amine catalyst are N-methyl morpholine, N-ethyl morpholine, hexadecyl dimethylamine, triethylamine, N,N,N',N'-tetramethyl-1,3-butanediamine, N,N - dimethylethanolamine, bis(2-dimethylaminoethyl)ether, N,N,N',N'-tetramethyl ethylenediamine, 4,4' - methylene bis(2-chloroaniline), dimethyl benzylamine, N-coco morpholine, triethylene diamine, [1,4-diazobicyclo(2,2,2)-octane], the formate salts of triethylene diamine, other salts of triethylene diamine and oxyalkylene adducts of primary and secondary amino groups, and the like. Such amine catalysts are preferably employed in the mixtures in an amount from 0.1 to 0.5 or 2 weight percent based on the total weight of the organic polyol starting materials. However, if desired, conventional metal catalysts may be used to supplement the preferred amine catalysts. Illustrative of such metal catalysts are the tin salts of various carboxylic acids and nickel acetylacetonates.

The relative amounts of the various components reacted in accordance with the above described process for producing cold cure polyether urethane foams in accordance with this invention are not narrowly critical. The polyether and the polyisocyanate are present in the foam formulations used to produce such foams in a major amount. The relative amounts of these two components is the amount required to produce the urethane structure of the foam and such relative amounts are well known in the art. The blowing agent, catalyst and surfactants are each present in a minor amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the surfactants are present in a foam-stabilizing amount (i.e. in an amount sufficient to stabilize the foam against voids and shrinkage). Preferred amounts of these various comments are given hereinabove.

The cold cure urethane foams produced in accordance with this invention can be used for the same purposes as corresponding conventional hot cure polyether urethane foams, e.g. they can be used wherever cushioning is desired, e.g. in furniture; in transportation systems, automobiles, planes, etc.; in carpeting; in the packaging of delicate objects; and the like.

Other additional ingredients can be employed in minor amounts in producing the cold cure polyether urethane foams in accordance with the process of this invention, if desired, for specific purposes. Thus inhibitors (e.g. d-tartaric acid and tertiary-butyl pyrocatechol, "Ionol") can be employed to reduce any tendency of the foam to hydrolytic or oxidative instability. Flame retardants (e.g. tris(2-chloroethyl)phosphate can be used. Dihydrocarbon silicone oils, e.g. dimethylsiloxanes, have been successfully mixed with the siloxane block copolymers employed in this invention to provide cold cure polyether urethane foams with fine cell structure with little or no shrinkage. Such mixtures help expand the usefulness of the siloxane block copolymers by broadening the copolymer concentration range, providing more processing latitude and increasing the adaptability of the block copolymer to a variety of foam formulations. Of course any suitable organic solvent for the amine catalysts and/or for the siloxane block copolymers can be used which does not substantially adversely affect the operation of the process or reactants. Examples of such solvents for the catalysts include, e.g., polyols, such as hexylene glycol (i.e. 2-methyl-2,4-pentanediol), dipropylene glycol, and the like. Examples of such solvents for the block copolymers include e.g. hydrocarbons; halohydrocarbons; organic polyether compounds such as the adducts of alkylene oxide and monols, diols or triols, such as

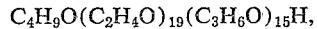

and dipropylene glycol; alkyl phthalates, such as dioctyl phthalate; and the like. Such siloxane block copolymer-solvent solutions preferably contain from 25 to 75 parts by weight of the copolymer per 100 parts by weight of the solvent and the copolymer but can contain from 1 to 99 parts by weight of the copolymer. Such solvents for the siloxane block copolymers can be used to adjust viscosity to provide for better control in metering and pumping of the copolymer. Especially useful solvents for the siloxane block copolymers are polyether triols such as adducts of ethylene oxide, propylene oxide or mixtures thereof with triol starters such as glycerol, 1,2,6 hexenetriol and the like. Examples of other additives that can be employed are crosslinkers such as glycerol, triethanol amine and their oxyalkylene adducts and anti-yellowing agents. Still other additives include organic surfactants such as nonionic, anionic, cationic and amphoteric surfactants (e.g. $C_9H_{19}C_6H_4(OC_2H_4)_{10.5}OH$). Such organic surfactant additives are especially useful when aqueous solutions of the siloxane block copolymer are employed for they serve to raise the cloud point of said aqueous solutions and to protect them from adversely high ambient temperatures which may be encountered during storage and shipping.

In accordance with this invention, the cold cure polyether urethane foams can be produced by any suitable technique. The preferred process is a one-step or one shot technique wherein all of the reactants are reacted simultaneously with the foaming operation. A second general process is called the prepolymer process whereby a prepolymer is formed by reacting the polyether starting material with a small excess of the isocyanate and later foaming the prepolymer by the reaction with water or an inert blowing agent. Another method which can be used is the quasi-prepolymer technique which involves reacting a large excess of the isocyanate with the polyether product with additional polyether in the presence of a blowing agent. Sometimes it is preferred to premix the polyether starting material and siloxane block copolymer although any suitable premixture of the various ingredients can be used. Because of the high exothermic nature of the reaction cold cure urethane foams are rapidly produced without the need of any external heat by mixing the reactants at ambient temperatures and pouring the foaming reaction mixture into a suitable mold and allowing the foam to cure itself. Of course, if desired the overall reaction can be even further accelerated by preheating the mold and/or employing conventional high temperature post curing procedures. Within a shorter period of time the cold cure process, with or without post cure, simultaneously achieves a greater degree of cure throughout the entire foam, and shorter tack free and demolding time than is generally achieved with conventional hot cure processes. For instance, cold cure foams can be removed from the mold far sooner without substantial damage to the surface than conventional hot cure foams. Of course it is to be understood that the cold cure foams of this invention can also be prepared in slabstock form, if desired.

An additional feature of the instant invention are the novel compositions suitable for use in producing cold cure polyether foam.

Such compositions include for example, those comprising (I) an organic polyol, (II) a polyisocyanate, said organic polyol and polyisocyanate being present in the composition in a major amount, (III) a minor amount of a blowing agent, (IV) a minor amount of an amine catalyst and (V) a minor amount of a siloxane block copolymer, said ingredients being those herein defined. The preferred compositions are those containing the preferred ingredients in their preferred amounts, both of which are also defined herein. Of course it is to be understood that the ingredients of the above compositions can be mixed and added in any suitable manner prior to commencing the cold cure reaction. Illustrative examples of preferred premixes include premixes of the organic polyol and siloxane block copolymer, which may also optionally contain an amine catalyst, and aqueous premixes of the siloxane block copolymer, amine catalyst, and an organic surfactant to raise the cloud point of said aqueous premixes.

The following examples illustrate the present invention and are not to be regarded as limitative. It is to be understood that Me represents a methyl radical, Et represents an ethyl radical, p.h.p. refers to parts of active siloxane block copolymer per hundred parts of organic polyol starting material and that all of the parts, percentages and proportions referred to herein and in the appended claims are by weight unless otherwise indicated.

For the sake of brevity the following designations are used to denote the various ingredients employed in the examples.

EXAMPLE 1

This example demonstrates the superiority of the siloxane block copolymers of this invention over similar siloxane block copolymers but outside of the scope of this invention in producing high resilient cold cure polyether urethane foams of improved cell structure without substantial foam shrinkage.

The foam formulations employed in producing the foams in this example were identical save for variations in the amount and siloxane block copolymer employed. The high resilient cold cure polyether foams were prepared by adding the ingredients to a mold and allowing the formulations to cure at ambient temperature. Thereafter the foam containing moles were placed in an oven at 125° C. for about 2 minutes to facilitate separation of the paper liner from the cardboard mold. Said formulations contained 100 parts by weight of organic polyols on the order of about 60 parts of polyether triol E3, about 30 parts of graft polymer/triol E2 and about 10 parts of polyether diol E5; about 2.5 parts by weight of water; about 0.1 part by weight of amine catalyst A1; about 1.0 parts by weight of amine catalyst A2; about 5 parts by weight of trichlorofluoromethane and about 37.5 parts by weight of polyisocyanate C6. The amount of nature of the siloxane block copolymer used was varied as reported

TABLE I.—COMPOSITIONS OF SILOXANE BLOCK COPOLYMERS HAVING THE GENERIC FORMULA

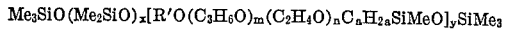

$Me_3SiO(Me_2SiO)_x[R'O(C_3H_6O)_m(C_2H_4O)_nC_aH_{2a}SiMeO]_ySiMe_3$

| Siloxane | x | y | m | n | R' | a | Mol. wt. | Percent Siloxane | Wt. percent ethylene oxide |
|---|---|---|---|---|---|---|---|---|---|
| I | 2.0 | 2.8 | 0 | 3 | Me | 2 | 1,000 | 47 | 100 |
| II | 4.0 | 2.8 | 0 | 3 | Me | 2 | 1,160 | 54 | 100 |
| III | 2.9 | 1.5 | 0 | 3 | Me | 2 | 750 | 62 | 100 |
| IV[1] | 2.8 | 1.9 | 0 | 0 | Et | 3 | 643 | 75 | 0 |
| V | 7.0 | 3.0 | 0 | 3 | Me | 2 | 1,430 | 60 | 0 |
| VI | 7.0 | 3.0 | 2.5 | 3.3 | Me | 3 | 1,910 | 45 | 50 |
| VII | 7.0 | 3.0 | 6.0 | 7.9 | Me | 3 | 3,100 | 28 | 50 |
| VIII | 0 | 1.0 | 0 | 7.0 | Me | 3 | 570 | 39 | 100 |
| IX | 72 | 5.0 | 29 | 20 | Me | 3 | 19,000 | 31 | 35 |
| X | 70 | 3.2 | 29 | 20 | Me | 3 | 14,000 | 41 | 35 |
| XI | 0 | 3.0 | 0 | 7.0 | Me | 3 | 1,390 | 25 | 100 |
| XII | 72 | 5.0 | 2.5 | 3.3 | Me | 3 | 7,500 | 77 | 100 |
| XIII | $Me_3SiO(Me_2SiO)_{50}[(C_6H_5CH_2CH_2SiMeO)]_9[MeO(C_3H_6O)_{29}(C_2H_4O)_{20}C_3H_6SiMeO]_6SiMe_3$ | | | | | | | | |

[1] Adduct of SiH with allylether.

NOTE.—Siloxanes I to VII represent block copolymers useful in this invention; siloxanes VIII to XIII represent block copolymers not useful in this invention.

TABLE II.—EMPIRICAL FORMULA FOR COPOLYMERS USEFUL FOR STABILIZATION OF COLD CURE FLEXIBLE POLYETHER URETHANE FOAM

| Siloxane | |
|---|---|
| I | $Me_3SiO(Me_2SiO)_2[MeO(C_2H_4O)_3C_2H_4SiMeO]_{2.8}SiMe_3$ |
| II | $Me_3SiO(Me_2SiO)_4[MeO(C_2H_4O)_3C_2H_4SiMeO]_{2.8}SiMe_3$ |
| III | $Me_3SiO(Me_2SiO)_{2.9}[MeO(C_2H_4O)_3C_2H_4SiMeO]_{1.5}SiMe_3$ |
| IV | $Me_3SiO(Me_2SiO)_{2.8}(CH_3CH_2OC_3H_6SiMeO)_{1.9}SiMe_3$ |
| V | $Me_3SiO(Me_2SiO)_7[MeO(C_2H_4O)_3C_2H_4SiMeO]_3SiMe_3$ |
| VI | $Me_3SiO(Me_2SiO)_7[MeO(C_3H_6O)_{2.5}(C_2H_4O)_{3.3}C_3H_6SiMeO]SiMe_3$ |
| VII | $Me_3SiO(Me_2SiO)_7[MeO(C_3H_6O)_6(C_2H_4O)_{7.9}C_3H_6SiMeO]_3SiMe_3$ |

TABLE III

| Designation | Composition |
|---|---|
| Organic polyols: | |
| E1 | This is a polyether triol, mol wt. about 5,000; hydroxyl number about 34; containing about 75 mole percent primary hydroxyl groups produced by reacting about 84% propylene oxide and about 16% ethylene oxide with glycerol. |
| E2 | This is a graft polymer/polyol; about 20 wt. percent graft polymer and about 80 wt. percent polyol; hydroxyl number about 28, produced by polymerizing acrylonitrile in E1. |
| E3 | This is a mixture of polyether triols, about 97.6 wt. percent E1 and about 2.4 wt. percent of a polyether triol, mol wt. about 270; hydroxyl number about 625, containing about 75 mole percent primary hydroxyl groups produced by reacting ethylene oxide with glycerol. |
| E4 | This is a polyether triol, mol wt. about 270; hydroxyl number about 625, containing about 75 mole percent primary hydroxyl groups produced by reacting ethylene oxide with glycerol. |
| E5 | This is a polyether diol, mol wt. about 2,300; hydroxyl number about 49, containing about 45 mole percent primary hydroxyl groups produced by reacting about 93% propylene oxide and about 7% ethylene oxide with dipropylene glycol. |
| E6 | This is polyether triol, mole wt. about 270, containing about 19 mole percent primary hydroxyl groups produced by reacting propylene oxide with glycerol. |
| E7 | This is a mixture of about 86.5 wt. percent E4 and about 13.5 wt. percent ethylene glycol, having a hydroxyl number of about 775-795 and containing about 70-80 mole percent primary hydroxyl groups. |
| Polyisocyanate catalysts: | |
| C1 | This is a mixture of about 80 wt. percent 2,4-tolylene diisocyanate and about 20 wt. percent 2,6-tolylene diisocyanate. |
| C2 | This is the isocyanate polymeric residue having an amine equivalent number of about 106, of the production of C1. |
| C3 | This is a polymethylene polyphenyl isocyanate polymer containing about 2.6-2.9 moles of NCO per mole of polymer and having an isocyanate content of about 31.4 percent. |
| C4 | This is a composition of about 60 wt. percent C3 and about 40 wt. percent C1. |
| C5 | This is a composition of about 84 wt. percent C1 and about 16 wt. percent E6. |
| C6 | This is a composition of about 50 wt. percent C5 and about 50 wt. percent C3. |
| C7 | This is a composition consisting of about 64 wt. percent C5; about 21.5 wt. percent C1 and about 14.5 wt. percent of tris(2-chloroethyl)phosphate. |
| C8 | This is a composition consisting of about 50 wt. percent C1 and 50 wt. percent C2. |
| Amine catalysts: | |
| A1 | This is a composition consisting of about 70 wt. percent bis(N,N-dimethylaminoethyl)ether and about 30 wt. percent dipropylene glycol solvent. |
| A2 | This is a composition consisting of about 33 wt. percent triethylenediamine and about 67 wt. percent dipropylene glycol solvent. |

TABLE IV

| Foam number | Siloxane block copolymer | Siloxane concentration (p.h.p.) | Cells per inch | Shrinkage |
|---|---|---|---|---|
| 1 | None (control) | | 22 | None. |
| *Copolymers of this invention* | | | | |
| 2 | Siloxane I | 0.05 | 26 | None. |
| 3 | do | 0.25 | 30 | Do. |
| 4 | do | 0.5 | 34 | Do. |
| 5 | Siloxane III | 0.025 | 26 | Do. |
| 6 | do | 0.05 | 30 | Do. |
| 7 | do | 0.25 | 42 | Slight. |
| 8 | Siloxane IV | 0.025 | 30 | None. |
| 9 | do | 0.05 | 40 | Slight. |
| 10 | Siloxane V | 0.025 | 30 | None. |
| 11 | do | 0.05 | 36 | Slight. |
| 12 | Siloxane VI | 0.05 | 28 | Do. |
| 13 | Siloxane VII | 0.05 | 26 | None. |
| *Copolymers not of this invention* | | | | |
| 14 | Siloxane VIII | 0.5 | 24 | Slight. |
| 15 | Siloxane X | 0.025 | 24 | Moderate. |
| 16 | Siloxane XI | 0.5 | 22 | None. |
| 17 | Siloxane XII | 0.05 | 8 | Moderate. |
| 18 | Siloxane XIII | 0.05 | 26 | Do. | in the above table which also reports on the cell structure and the shrinkage of the uncrushed cold cure polyether urethane foams produced.

EXAMPLE 2

This example demonstrates the improvement in cell structure with little if any shrinkage of the cold cure polyether urethane foams by employing the siloxane block copolymers of this invention. The foams were produced in the same manner as Example 1, using formulations containing 100 parts by weight of organic polyol composition consisting of 98.0 parts by wt. of a blend of about 80 wt. percent polyether triol E1 and about 20 wt. percent graft polymer/triol E2 and about 2.0 parts by weight of triethanolamine; about 2.8 parts by weight of water, about 1.0 parts by weight of amine catalyst A2; about 0.3 part by weight of triethylamine catalyst, and about 41.2 parts by weight of polyisocyanate C4. Again the amount and nature of the siloxane block copolymer used was varied as reported in the following table which also reports on the cell structure and the shrinkage of the uncrushed cold cure polyether urethane foams produced.

Again the amount and nature of the siloxane block copolymer used was varied as reported in the following table which also reports on the cell structure and the shrinkage of the uncrushed cold cure polyether urethane foams. The foams were also subsequently crushed and given a resilience test according to ASTM D-1564-R. The resilience test is also referred to as the Nopco Percent Ball Rebound test and is reported in the "Handbook of Foamed Plastics" by R. J. Bender, p. 66 (1965). These values for said foams are also reported in the following table; a value of 45% or higher indicates a high resilience for the foam. All the foams containing a siloxane block copolymer had approximately the same density and porosity.

TABLE VI

| Foam number | Siloxane block copolymer | Siloxane concentration (p.h.p.) | Shrinkage | Cells per inch | Percent ball rebound |
|---|---|---|---|---|---|
| 1 | None (control) | | None | 26 | 57 |
| | Copolymers of this invention | | | | |
| 2 | Siloxane I | 0.25 | None | 36 | 54 |
| 3 | Siloxane III | 0.10 | do | 40 | 54 |
| | Copolymers not of this invention | | | | |
| 4 | Siloxane XIII | 0.10 | Moderate | 36 | 56 |

EXAMPLE 4

This example demonstrates the improvement in cell structure with little if any shrinkage of the cold cure polyether urethane foams by employing a solvent solution of the siloxane block copolymers of this invention. The foams were produced in the same manner as Example 1, using formulations containing 100 parts by weight of polyether triol E1, about 7.0 parts by weight of triethanolamine, about 3.2 parts by weight of water,

TABLE V

| Foam number | Siloxane block copolymer | Siloxane concentration (p.h.p.) | Cells per inch | Shrinkage | Cell uniformity |
|---|---|---|---|---|---|
| 1 | None (control) | | 25 | None | Voids. |
| | Copolymers of this invention | | | | |
| 2 | Siloxane III | 0.05 | 36 | None | No voids. |
| 3 | do | 0.10 | 40 | do | Do. |
| 4 | do | 0.25 | 45 | Moderate | Do. |
| 5 | Siloxane I | 0.25 | 38 | None | Do. |
| 6 | do | 0.50 | 40 | do | Do. |
| | Copolymers not of this invention | | | | |
| 7 | Siloxane IX | 0.05 | 30 | Severe | No voids. |

EXAMPLE 3

This example demonstrates that the siloxane block copolymers of this invention help provide high resilient cold cure polyether urethane foams having improved cell structure with little if any shrinkage. The foams were produced in the same manner as Example 1, using formulations containing 100 parts by weight of polyether triol E1, about 7.0 parts by weight of triethanolamine, about 3.2 parts by weight of water, about 1.5 parts by weight of amine catalyst A2, about 5.0 parts by weight of tris(2-chloroethyl)phosphate a flame retardant, and about 53.1 parts by weight of polyisocyanate C8.

about 1.5 parts by weight of amine catalyst A2, and about 53.1 parts by weight of polyisocyanate C8. The amount of the siloxane block copolymer used was varied as reported in the following table, which also reports on the cell structure and the shrinkage of the uncrushed cold cure polyether urethane foams.

TABLE VII

| Foam number | Siloxane block copolymer | Siloxane concentration (p.h.p.) | Cells per inch | Shrinkage | Quality of foam |
|---|---|---|---|---|---|
| 1 | None (control) | | 22 | None | Bottom and side voids. |
| 2 | Siloxane II [1] | 0.19 | 35 | do | No voids. |
| 3 | do [2] | 0.12 | 35 | do | Do. |

[1] Used as a 15/85 wt. percent solution of Siloxane II in $C_4H_9O(C_2H_4O)_{19}(C_3H_6O)_{15}H$.
[2] Used as a 10/90 wt. percent solution of Siloxane II in $C_4H_9O(C_2H_4O)_{19}(C_3H_6O)_{15}H$.

EXAMPLE 5

This example demonstrates that the siloxane block copolymers of this invention cause little, if any, increase in flammability of a flame retarded cold cure foam, while a siloxane block copolymer not of this invention aggravates burning. The foams employed were those of Example 3 and the extent of burning in inches of the uncrushed foams was measured according to ASTM 1692-67T and is reported in the following table.

TABLE VIII

| Foam number | Siloxane block copolymer | Burning extent in inches |
|---|---|---|
| 1 | none (control) | 1.92 |
| Copolymers of this invention | | |
| 2 | Siloxane I | 1.68 |
| 3 | Siloxane III | 1.79 |
| Copolymer not of this invention | | |
| 4 | Siloxane XIII | 2.85 |

EXAMPLE 6

This example illustrates the improvement against flammability, in cell structure, and absence of shrinkage, provided by the siloxane block copolymers of this invention in producing cold cure polyether urethane foams which do not contain a flame retardant. The foams were produced in the same manner as Example 1, using formulations containing 100 parts by weight of organic polyol on the order of about 85 parts of polyether triol E3 and about 15 parts of polyether triol E7; about 2.5 parts by weight of water; about 1.0 parts by weight of amine catalyst A2 and about 60.4 parts by weight of polyisocyanate C7. The amount and nature of the siloxane block copolymer used was varied as reported in the following table which also reports on the cell structure, shrinkage and flammability of the uncrushed cold cure polyether urethane foams produced. The flammability test was carried out according to ASTM 1692-67T.

TABLE IX

| Foam number | Siloxane block copolymer | Siloxane concentration (p.h.p.) | Cell structure | Shrinkage | Burning extent in inches |
|---|---|---|---|---|---|
| 1 | None (control) | | Coarse | None | 0.99 |
| Copolymer of this invention | | | | | |
| 2 | Siloxane 1 [1] | 0.15 | Fine | None | 0.89 |
| Copolymer not of this invention | | | | | |
| 3 | Siloxane IX [2] | 0.08 | Fine | Severe | 5.0 |

[1] Used as a 20/80 wt. percent solution of Siloxane I in $C_4H_9O(C_2H_4O)_{19}(C_3H_6O)_{15}H$.
[2] Used as a 55/45 wt. percent solution of Siloxane IX in a 90/10 wt. percent solvent mixture of $C_4H_9O(C_2H_4O)_{19}(C_3H_6O)_{15}H$ and a polyether adduct produced by reacting 10.5 moles of ethylene oxide and 1 mole of nonylphenol.

EXAMPLE 7

This example illustrates the use of combinations of siloxane block copolymers of this invention and dihydrocarbon siloxane oils can be employed to provide uniform fine-celled cold cure polyether urethane foams with little, if any, shrinkage. The foams were produced in the same manner as Example 1 while the foam formulations were also the same as in Example 1 using Siloxane III, except that a dimethyl siloxane oil having the formula $$Me_3SiO(Me_2SiO)_3SiMe_3$$

where Me is methyl and a viscosity of about 2 centistokes at 25° C. was also employed. The amounts of Siloxane III and dimethyl siloxane oil were varied as reported in the following table along with the cell structure and shrinkage of the uncrushed cold cure polyether urethane foams produced.

TABLE X

| Foam number | Siloxane block copolymer concentration (p.h.p.) | Dimethyl siloxane oil concentration (p.h.p.) | Cells per inch | Shrinkage | Cell structure |
|---|---|---|---|---|---|
| 1 | None [1] | None | 22 | None | Irregular. |
| 2 | 0.25 | 1.0 | 30 | do | Uniform. |
| 3 | 0.50 | 2.0 | 30 | do | Do. |
| 4 | 0.17 | 0.33 | 37 | do | Do. |

[1] Control.

EXAMPLE 8

Cold cure foams were produced in the same manner as Example 2 while the foam formulations were also the same as in Example 2 using Siloxane III, except that a cyclic dimethyl siloxane oil consisting essentially of dimethyl tetramer was also employed. The amounts of Siloxane III and cyclic dimethyl oil were varied as reported in the following table along with the cell structure and shrinkage of the uncrushed cold cure polyether urethane foams produced.

TABLE XI

| Foam number | Siloxane block copolymer concentration (p.h.p.) | Dimethyl siloxane oil concentration (p.h.p.) | Cells per inch | Shrinkage | Cell structure |
|---|---|---|---|---|---|
| 1 | None [1] | None | 25 | None | Voids. |
| 2 | 0.1 | do | 40 | do | No voids. |
| 3 | 0.25 | 1.0 | 42 | do | Do. |

[1] Control.

EXAMPLE 9

A mixture of about 72.9 grams (0.43 mole of OEt) of equilibrated ethoxy-endblocked siloxanes, obtained by potassium silanolate catalyzed equilibration of cyclic dimethylsiloxanes, methyltriethoxysilane and dimethyldiethoxysilane, having the average structure $$(Me_2SiO_{4.1}Me_{1.2}Si(OEt)_{2.8}$$

about 77.1 grams (0.47 mole of OH) of dry methoxytriglycol, about 100 grams of toluene, about 0.12 grams of anhydrous potassium acetate and 0.3 grams of trifluoroacetic acid was heated to reflux and the ethanol removed by azeotropic distillation through a packed column. About 3 grams of sodium bicarbonate was then added and the solvent removed by sparging with nitrogen at 130° C. and the stripped material filtered. The filtrate was a siloxane block copolymer having the following average formula $$(Me_2SiO)_{4.1}Me_{1.2}Si[(OC_2H_4)_3OMe]_{2.8}$$

The siloxane copolymer had a viscosity of about 13 centistokes at 25° C.

This siloxane block copolymer was evaluated in the production of cold cure polyether urethane foams. The foams were produced in the same manner as Example 1, using formulations containing 100 parts by weight of polyether triol E1, about 7.0 parts by weight of triethanol amine, about 3.2 parts by weight of water, about 1.5 parts by weight of amine catalyst A2, about 5.0 parts by weight of tris-(2-chloroethyl)phosphate, and about 53.1 parts by weight of polyisocyanate C8. The amount of the siloxane block copolymer, $$(Me_2SiO)_{4.1}Me_{1.2}Si[(OC_2H_4)_3OMe]_{2.8}$$

employed varied as reported in the following table which also reports on the cell structure and uniformity of the uncrushed foam produced.

TABLE XII

| Foam number | Siloxane block copolymer concentration (p.h.p.) | Cells per inch | Cell uniformity |
|---|---|---|---|
| 1 | [1] None | 24 | Voids. |
| 2 | 0.1 | 39 | No voids. |
| 3 | 0.05 | 32 | Do. |

[1] Control.

EXAMPLE 10

The following premix solutions were prepared:

TABLE XIII

| Component | Parts by weight | | |
|---|---|---|---|
| | Solution A [1] | Solution B | Solution C [2] |
| Polyol E1 | | 80.0 | |
| Water | 63.0 | | 63.0 |
| N-ethyl morpholine | 4.6 | | 4.6 |
| Triethylenediamine | 23.2 | | 23.2 |
| Siloxane II | 4.6 | 2.0 | |
| $C_9H_{19}C_6H_4(OC_2H_4)_{10.5}OH$ | 4.6 | | 4.6 |

[1] Without the organic nonionic surfactant, Siloxane II was insoluble in ust the water plus amines of Solution A.
[2] Not of this invention.

Cold cure polyether urethane foams were prepared using the following formulations:

TABLE XIV

| Component | Parts by weight | | | |
|---|---|---|---|---|
| | F1 | F2 | F3[1] | F4[2] |
| Polyol: | | | | |
| E1 [1] | 80.0 | 80.0 | 80.0 | 80.0 |
| E2 [2] | 20.0 | 20.0 | 20.0 | 20.0 |
| Solution: | | | | |
| A | 4.3 | | | |
| B | | 1.0 | | |
| C | | | 4.1 | |
| Water | | 2.7 | | |
| N-ethyl morpholine | | 0.2 | | 0.2 |
| Triethylenediamine | | 1.0 | | 1.0 |
| Polyisocyanate [3] | 37.7 | 37.7 | 37.7 | 37.7 |

[1] Not of this invention.
[2] The polyols were employed as a blended premix with each other.
[3] The polyisocyanante was a blend of 40 wt. percent C1, 40 wt., percent C2 and 20 wt. percent C3.

Using charges based on 200 grams of organic polyol the above formulations were poured into an 8 inch by 8 inch by six inch cardboard box and allowed to react and cure at room temperature. The properties of the uncrushed cold cure polyether urethane foams obtained are shown in the following table.

TABLE XV

| Foam properties | F1 | F2 | F3[1] | F4[1] |
|---|---|---|---|---|
| Rise, inches | 4.3 | 4.6 | 4.2 | 4.1 |
| Shrinkage | ([2]) | ([2]) | ([2]) | ([2]) |
| Cells per inch | 30 | 30 | 10 | 10 |
| Cell uniformity | Good | Good | Poor | Poor |

[1] Not of the invention.
[2] None.

EXAMPLE 11

The following formulations were used to produce cold cure semi-flexible polyether urethane foam in the same manner as Example 1. The formulations contained 100 parts by weight of organic polyol on the order of about 85 parts of polyether triol E3 and about 15 parts of polyether triol E7; about 1.9 parts by weight of water; about 1.3 parts by weight of amine catalyst A2; about 20 parts by weight of calcium carbonate; about 1.0 parts by weight of carbon black and about 67.3 parts by weight of polyisocyanate C5. The amount and nature of the siloxane block copolymer was varied as reported in the following table along with the properties of the uncrushed cold cure polyether urethane foams produced.

TABLE XVI

| Foam number | Siloxane block copolymer | Siloxane concentration (p.h.p.) | Cells per inch | Cell uniformity | Foam shrinkage |
|---|---|---|---|---|---|
| 1 | None (control) | | 25 to 35 | Poor | |
| Copolymer of this invention | | | | | |
| 2 | Siloxane I | 0.5 | 35 to 40 | Good | None. |
| 3 | do | 1.0 | >40 | do | Slight. |
| Copolymer not of this invention | | | | | |
| 4 | Siloxane IX | 0.25 | | Good | Severe. |
| 5 | do | 0.05 | | do | Do. |

Various modifications and variations of this invention will be obvious to a worker skilled in the art and it is to be understood that such modifications and variations are to be included within the purview of this application and the spirit and scope of the appended claims.

What is claimed is:

1. A process for producing cold cure, high resilience polyether urethane foam, said process comprising foaming and reacting a mixture comprising:
    (I) an organic polyol selected from the group consisting of (A) a polyether triol containing at least 40 mole percent primary hydroxyl groups and having a molecular weight from about 2,000 to about 8,000 and (B) a mixture of said polyether triol and another polyether having an average of at least two hydroxyl groups, said polyether triol of said mixture amounting to at leatst 40 weight percent of the total polyol content;

(II) an organic polyisocyanate, said organic polyol and said polyisocyanate being present in the mixture in a major amount and in the relative amount required to produce the urethane;

(III) a blowing agent in a minor amount sufficient to foam the reaction mixture;

(IV) a catalytic amount of a catalyst for the production of the urethane; and (V) a siloxane block copolymer surfactant in an amount sufficient to stablize the foam against voids and shrinkage having a molecular weight from about 500 to about 2,500, a siloxane content from about 40 to about 70 weight percent based on the weight of the copolymer and an oxyethylene content of at least 35 weight percent based on the total amount of any oxyalkylene groups present in said copolymer, said copolymer having the formula

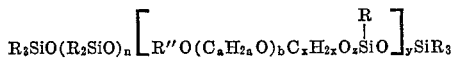

wherein $z$ has a value of 0 or 1, $n$ has a value from 2 to 7 inclusive, $y$ has a value from 1 to 6 inclusive, $a$ has a value from 2 to 4 inclusive, $x$ has a value from 2 to 4 inclusive, $b$ has a value from 0 to 10 inclusive, R'' is a member selected from the class consisting of an alkyl radical, an aryl radical, an aralkyl radical, an acyl radical, a carbamyl radical, and a carbonate radical and R is a monovalent hydrocarbon radical.

2. A process as defined in claim 1 wherein the catalyst is an amine catalyst.

3. A process as defined in claim 2 wherein the blowing agent is selected from the group consisting of water, fluorocarbons and mixtures thereof.

4. A process as defined in claim 2, wherein the polyisocyanate is selected from the group consisting of tolylene diisocyanate, polymethylene polyphenyl polymeric isocyanates, and mixtures thereof.

5. A process as defined in claim 2 wherein minor amounts of additional ingredients selected from the group consisting of a flame retardant agent, an organic solvent for the amine catalyst, an organic solvent for the siloxane block copolymer, a dimethyl siloxane oil and an organic surfactant, and mixtures thereof are also present in the reaction mixture.

6. A process as defined in claim 1 wherein the organic polyol polyether triol contains from about 60 to 90 mole percent primary hydroxyl groups and has a molecular weight from about 4,000 to 7,000.

7. A process as defined in claim 6 wherein the organic polyol is a mixture of said polyether triol and another polyether having an average of at least two hydroxyl groups, said polyether triol of said mixture amounting to at least 40 weight percent of the total polyol content.

8. A process as defined in claim 6 wherein the other polyether is a graft acrylonitrile/polyether triol.

9. A process as defined in claim 6, wherein R is a methyl radical.

10. A process as defined in claim 6, wherein R and R'' are methyl radicals, wherein $z$ is 1, wherein $n$ is 2 to 7 inclusive, wherein $y$ is 2 to 6 inclusive, wherein $a$ is 2 to 3 inclusive, and wherein $b$ is 3 to 10 inclusive.

11. A process for producing cold cure polyether urethane foam, said process comprising foaming and reacting a mixture comprising:

(I) a mixture of a polyether triol, said triol containing 60 to 90 mole percent primary hydroxyl groups and having a molecular weight from about 4,000 to 7,000 and another polyether having an average of at least two hydroxyl groups, said polyether triol of said mixture amounting to at least 40 weight percent of the total polyol content;

(II) a polyisocyanate selected from the group consisting of tolylene diisocyanate, polymethylene polyphenyl polymeric isocyanate, and mixtures thereof, said isocyanates being present in an amount from 90 to 105% of the amount required to provide the stoichiometric amount of isocyanate groups required to react with the hydroxyl groups of the organic polyol and any water present as a blowing agent;

(III) from 2 to 20 parts by weight per 100 parts by weight of the organic polyol starting material of at least one blowing agent selected from the group consisting of water and fluorocarbon blowing agents;

(IV) a catalytic amount of an amine catalyst; and (V) about 0.025 to about 5 parts by weight per 100 parts by weight of the organic polyol starting material of a siloxane block copolymer as defined in claim 1.

12. A process as defined in claim 11, wherein the siloxane block copolymer has the formula

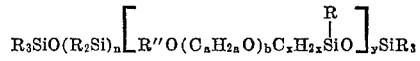

wherein R and R'' are methyl radicals, wherein $n$ is 2 to 7 inclusive, wherein $y$ is 2 to 6 inclusive, wherein $a$ is 2 to 3 inclusive, wherein $x$ is 2 to 4 inclusive and wherein $b$ is 3 to 10 inclusive.

13. A process as defined in claim 12 wherein $a$ is 2.

14. The process as defined in claim 11, wherein the silioxane block copolymer used in forming the reaction mixture is in the form of a mixture consisting essentially of a major amount of the organic polyol and a minor amount of the siloxane block copolymer.

15. The process as defined in claim 11, wherein the siloxane block copolymer used in forming the reaction mixture is in the form of an aqueous solution consisting essentially of a major amount of water, a minor amount of amine catalyst, a minor amount of an organic surfactant and a minor amount of the siloxane block copolymer.

16. The cold cured polyether urethane foam produced by the process as defined in claim 1.

17. A process as defined in claim 12, wherein the siloxane block copolymer has the formula

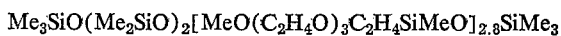

18. A process as defined in claim 12, wherein the siloxane block copolymer has the formula

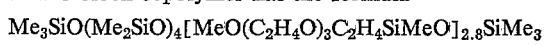

References Cited

UNITED STATES PATENTS

| | | | |
|---|---|---|---|
| 3,507,815 | 4/1970 | Bailey | 260—2.5 AH |
| 3,505,377 | 4/1970 | Morehouse | 260—2.5 AH |
| 3,420,782 | 1/1969 | Dahm | 260—2.5 AH |
| 3,560,544 | 2/1971 | Haluska | 260—2.5 AH |
| 3,526,651 | 9/1970 | Rossmy | 260—2.5 AH |

FOREIGN PATENTS

| | | | |
|---|---|---|---|
| 1,101,752 | 8/1959 | Germany | 260—2.5 AH |
| 1,081,083 | 8/1967 | Great Britain | 260—2.5 AH |
| 944,904 | 12/1963 | Great Britain | 260—2.5 AH |
| 666,545 | 10/1966 | Republic of Africa. | |
| 1,162,517 | 8/1969 | Great Britain. | |

DONALD E. CZAJA, Primary Examiner

C. IVY, Assistant Examiner

U.S. Cl. X.R.

252—182; 260—2.5 AP, 2.5 AQ, 2.5 BD

PO-1050
(5/69)

UNITED STATES PATENT OFFICE
CERTIFICATE OF CORRECTION

Patent No. 3,741,917　　　　　　　　Dated June 26, 1973

Inventor(s) Edward Lewis Morehouse

It is certified that error appears in the above-identified patent and that said Letters Patent are hereby corrected as shown below:

Column 21, line 3, correct the spelling of the term "least." Column 21, line 67 (line 1 of claim 11) after the term "cure" insert---, high resilience---. Column 22, line 25 that portion of the formula shown as "($R_2Si$)" should read ---($R_2SiO$)---.

Signed and sealed this 18th day of December 1973.

(SEAL)
Attest:

EDWARD M.FLETCHER,JR.　　　　　　RENE D. TEGTMEYER
Attesting Officer　　　　　　　　　Acting Commissioner of Patents